US010520134B2

(12) United States Patent
Kolb et al.

(10) Patent No.: US 10,520,134 B2
(45) Date of Patent: Dec. 31, 2019

(54) HANDHELD WORK APPARATUS HAVING A DEVICE FOR STARTING AN ELECTRIC DRIVE MOTOR

(71) Applicant: Andreas Stihl AG & Co. KG, Waiblingen (DE)

(72) Inventors: Joachim Kolb, Ludwigsburg (DE); David Kraetzig, Ludwigsburg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 278 days.

(21) Appl. No.: 15/465,435

(22) Filed: Mar. 21, 2017

(65) Prior Publication Data
US 2017/0268723 A1     Sep. 21, 2017

(30) Foreign Application Priority Data

Mar. 21, 2016 (DE) .......................... 10 2016 003 426

(51) Int. Cl.
*F16P 3/20* (2006.01)
*A01G 3/053* (2006.01)
*B25F 5/00* (2006.01)

(52) U.S. Cl.
CPC ............... *F16P 3/20* (2013.01); *A01G 3/053* (2013.01); *B25F 5/00* (2013.01)

(58) Field of Classification Search
CPC ........................................................ F16P 3/20
USPC ......................................................... 173/216
See application file for complete search history.

(56) References Cited

U.S. PATENT DOCUMENTS

| 3,954,162 A | * | 5/1976 | Densow | F16D 43/18 |
| | | | | 192/105 CE |
| 4,449,313 A | * | 5/1984 | Hackett | F41A 19/10 |
| | | | | 42/69.01 |
| 4,696,108 A | * | 9/1987 | Zerrer | A01D 34/902 |
| | | | | 30/276 |

(Continued)

FOREIGN PATENT DOCUMENTS

DE       10359873 B3 * 5/2005   ............. B27B 17/10

OTHER PUBLICATIONS

Definition of "arc", retrieved from https:www.merriam-webster.com/arc on Mar. 21, 2019 (Year: 2019).*

(Continued)

*Primary Examiner* — Hemant Desai
*Assistant Examiner* — Amelia Jae-Ippel Vorce
(74) *Attorney, Agent, or Firm* — Walter Ottesen, P.A.

(57) ABSTRACT

A handheld work apparatus has a device for starting an electric drive motor via an actuating element which can be displaced in a handle counter to an actuating force and acts on a transmission element. The transmission element is shiftable from a rest position into an operating range, wherein the transmission element actuates a switching element and starts the motor. For shifting from the rest position into an end position, a shift force is applied. The shift force forms at least a portion of the actuating force. To keep the actuating force low after the motor is switched on, the displacement path of the transmission element is divided into a first segment and a second segment which includes the operating range. The shift force to be applied to the transmission element rises on the first segment of the path and, after a maximum, decreases on the second segment.

15 Claims, 7 Drawing Sheets

(56) References Cited

U.S. PATENT DOCUMENTS

| | | | | |
|---|---|---|---|---|
| 4,798,185 A | * | 1/1989 | Driggers | A01D 34/90 |
| | | | | 123/400 |
| 4,898,039 A | * | 2/1990 | Aiyama | A01G 3/053 |
| | | | | 123/396 |
| 5,401,928 A | * | 3/1995 | Kelley | H01H 9/06 |
| | | | | 200/510 |
| 5,653,030 A | | 8/1997 | Yokoyama et al. | |
| 5,724,737 A | * | 3/1998 | Stones | B27B 17/0008 |
| | | | | 192/131 R |
| 5,806,191 A | | 9/1998 | Yokoyama et al. | |
| 5,842,277 A | * | 12/1998 | Haberlein | A01G 3/062 |
| | | | | 30/276 |
| 7,269,904 B2 | * | 9/2007 | Schmidt | B27B 17/00 |
| | | | | 173/170 |
| 2005/0210685 A1 | * | 9/2005 | Jong | B27B 17/083 |
| | | | | 30/382 |
| 2006/0137653 A1 | * | 6/2006 | Amend | F02D 11/02 |
| | | | | 123/400 |
| 2007/0221158 A1 | * | 9/2007 | Schmidt | F02M 1/02 |
| | | | | 123/179.16 |
| 2010/0218388 A1 | * | 9/2010 | Myers | B27B 17/083 |
| | | | | 30/383 |
| 2011/0061246 A1 | * | 3/2011 | Martinsson | B27B 17/083 |
| | | | | 30/383 |
| 2013/0199049 A1 | * | 8/2013 | Xing | B26B 25/00 |
| | | | | 30/377 |
| 2014/0166325 A1 | * | 6/2014 | Goetzel | F02D 11/02 |
| | | | | 173/170 |
| 2014/0352660 A1 | * | 12/2014 | Kurzenberger | F02D 29/00 |
| | | | | 123/400 |
| 2014/0366828 A1 | * | 12/2014 | Eberle | F02B 63/02 |
| | | | | 123/179.1 |

OTHER PUBLICATIONS

Definition of "flank", retrieved from https:www.merriam-webster.com/flank on Mar. 21, 2019 (Year: 2019).*

* cited by examiner

HANDHELD WORK APPARATUS HAVING A DEVICE FOR STARTING AN ELECTRIC DRIVE MOTOR

CROSS REFERENCE TO RELATED APPLICATION

This application claims priority of German patent application no. 10 2016 003 426.2, filed Mar. 21, 2016, the entire content of which is incorporated herein by reference.

FIELD OF THE INVENTION

The invention relates to a handheld work apparatus with a device for starting an electric drive motor via at least one actuating element. The actuating element can be a "throttle lever" which is arranged in a handle of the work apparatus and can be shifted counter to an actuating force into an operating position. Coupled to the actuating element is a transmission element which, depending on the actuation, is shiftable from a rest position into an operating range. In this case, an electric switching element via which the electric drive motor of the work apparatus is put into operation is actuated via the transmission element. The transmission element is to be shifted on its displacement path from the unactuated rest position into an end position with a shift force, wherein the shift force to be applied for moving the transmission element forms at least a portion of the actuating force to be applied to the actuating element.

BACKGROUND OF THE INVENTION

Handheld work apparatuses of this type, in particular battery-operated work apparatuses, are generally secured against unintentional starting via a "two-handed safety mechanism". In order to put the battery-operated work apparatus into operation, advantageously a first actuating element, which is arranged in the rear handle, as throttle lever and a second actuating element, which is arranged on a front handle, should be pressed down simultaneously or one after the other.

A disadvantage of these arrangements is that, even when the work apparatus is switched on, the return springs provided in the overall arrangement act on the actuating elements, and therefore the user has to continuously resist these spring return forces during the operation of the work apparatus.

If the return springs are weaker, although working for the user is more tolerable with acceptable counterforces at the actuating elements, the work apparatus can then be switched on very easily and with little effort, which is disadvantageous.

SUMMARY OF THE INVENTION

It is an object of the invention to provide a handheld work apparatus with a switching element for switching on an electric drive motor configured such that, firstly, high actuating forces are necessary for switching it on via an actuating element and, secondly, after it is switched on, the actuating forces can be resisted by the user with an acceptable effort even over a relatively long working period.

The object can, for example, be achieved by a handheld work apparatus including: an electric motor; a handle; an actuating element arranged in the handle and configured to be displaceable to an operating position counter to an actuating force; a starter device configured to start the electric motor via the actuating element; a transmission element coupled to the actuating element in a positionally dependent manner and configured to be adjustable from a rest position to an operating range in dependence upon a position of the actuating element; an electrical switching element; the transmission element being configured to actuate the electrical switching element in order to start the electric motor; the transmission element being configured to be adjustable from the rest position along a displacement path to an end position via a shift force; the shift force required for moving the transmission element forming at least a portion of the actuating force; the displacement path including a first path segment adjoining the end position; the displacement path including a second path segment adjoining the first path segment; the second path segment including the operating range; and, the shift force required for moving the transmission element increasing in the first path segment and decreasing in the second path segment after reaching a maximum.

According to an aspect of the invention, the displacement path of the transmission element is configured in such a manner that it has a first path segment adjoining the rest position and a second path segment adjoining the first path segment. The second path segment includes the operating range of the work apparatus. The shift force to be applied to the transmission element rises steeply on the first path segment of the displacement path in order, after a maximum is reached, to decrease again on the second path segment of the displacement path.

The configuration of the device for starting the electric drive motor ensures that, after the drive motor is switched on, the actuating forces to be withstood by the user are smaller than at the moment of switching on the electric drive motor. On the displacement path from the rest position into the end position of the transmission element, the actuating force initially rises steeply in order, after a maximum is exceeded, to fall again.

The actuating force to be applied to the actuating element for pressing down the actuating element is formed of a spring force of a return spring of the actuating element and the shift force to be applied to the transmission element.

In an embodiment of the invention, it is provided that the sum of the shift force and of the spring force remains the same or drops over a partial segment of the displacement path of the transmission element.

If the electric switching element is actuated in a region of the maximum of the shift force and switches on the electric drive motor, the user has to apply a high switch-on force to start the work apparatus. This is a reliable measure against unintentionally switching on the electric drive motor.

In an embodiment of the invention, the transmission element is configured as an intermediate lever which is rotatable about a lever axis and is preferably configured as a two-armed lever. A coupling element which is shiftable with the actuating element acts on a first lever arm of the intermediate lever, wherein the effective lever length between the coupling element and the lever axis of the intermediate lever changes depending on the rotational angle of the intermediate lever. The effective lever length changes depending on the displacement path.

In an embodiment of the invention, the electric switching element is switched by a switching cam which rotates about a cam axis. The switching cam is expediently connected to the intermediate lever via a tension rod which is coupled to a second lever arm of the intermediate lever.

In order to avoid an end stop of the device for starting the electric drive motor, it is provided that the switching cam is rotatable beyond the switching position of the electric switching element. This ensures an extended actuating range in which the user can easily move the actuating element—on the far side of the switching position—without the switching element switching. This results in increased comfort when holding the actuating element in the operation position.

The electric switching element is advantageously configured as an operating switch with a switching leaf. The switching cam has a rising flank which, in a rest position, when the actuating element of the switching cam is unactuated, lies at a spacing from the switching leaf of the switching element. The electric switching element can also be a contactless switching element, for example a Hall sensor or a reed contact which can be actuated by a permanent magnet moved with the switching cam.

In an embodiment of the invention, the switching cam has a run-out flank which adjoins the rising flank and is preferably configured as a circular arc segment about the cam axis. The configuration as the circular arc segment makes it possible in a simple manner for the switching cam to be rotatable beyond the switching position of the electric switching element.

The switching cam expediently has a further second cam path for a further electric switching element, for example for a brake switch.

The effective length of the switching leaf of the switching element changes as the switching cam rotates. The spacing, forming a switching lever, between the switching cam and an actuating axis of the switching leaf will increase as the switching cam rotates into the switch-on position. As a result, after the switching on, the switching forces on the switching element will become smaller in the operating range of the transmission element.

In the rest position of the transmission element, the first lever arm between the coupling element and the lever axis of the transmission element has an effective first length. In the rest position of the transmission element, a second lever arm between the lever axis of the transmission element and the coupling point of the transmission element to the switching cam has an effective second length. An advantageous configuration of the device for electrically switching on a drive motor is obtained if the effective first length of the first lever arm is smaller than the effective second length of the second lever arm.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
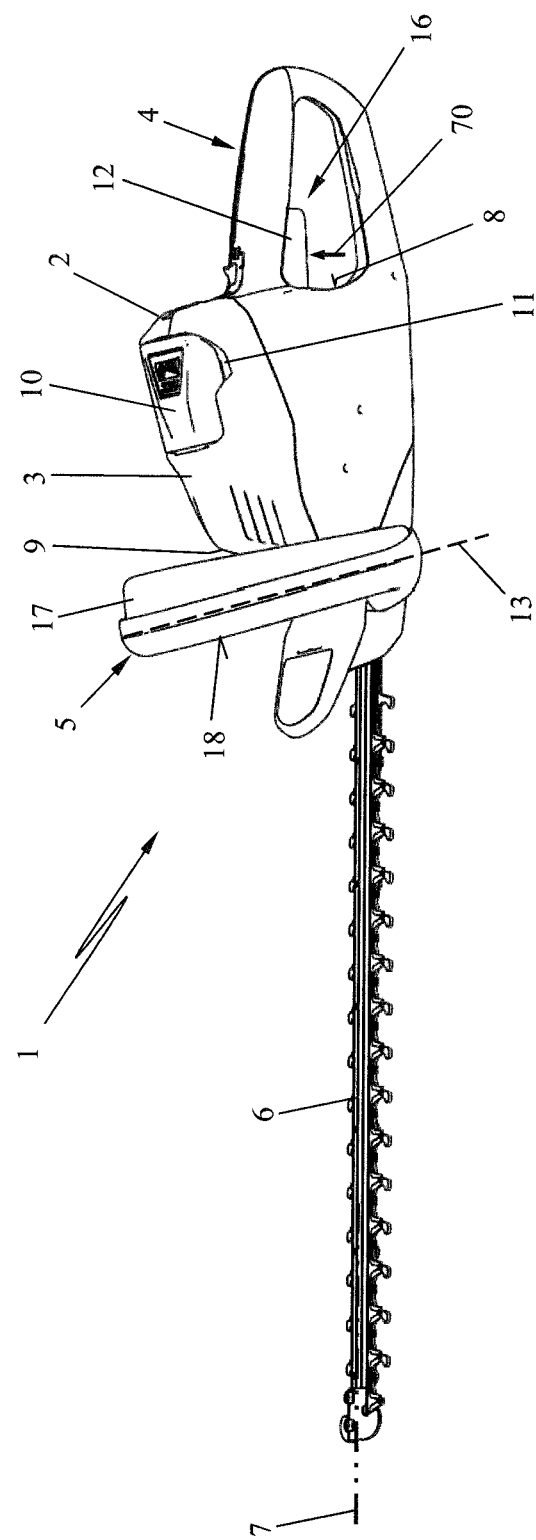
FIG. 1 shows a side view of a handheld work apparatus using the example of a battery-operated hedge trimmer.

The handheld work apparatus 1 illustrated in FIG. 1 is a hedge trimmer 2 in the embodiment. The housing 3 of the work apparatus 1 has a rear first handle 4 and a front second handle 5. The first handle 4 is oriented in the direction of the longitudinal axis 7 of the work apparatus 1. The first handle 4 is arranged at the one rear end 8 of the housing 3.

The second handle 5 which, in the embodiment, is configured as a bale handle, is provided in the region of the front end 9 of the housing 3. The second handle 5 lies in a plane 13 between the front end 9 of the housing 3 and a tool 6 of the work apparatus 1, in the embodiment a cutter blade bar.

Figure 2:
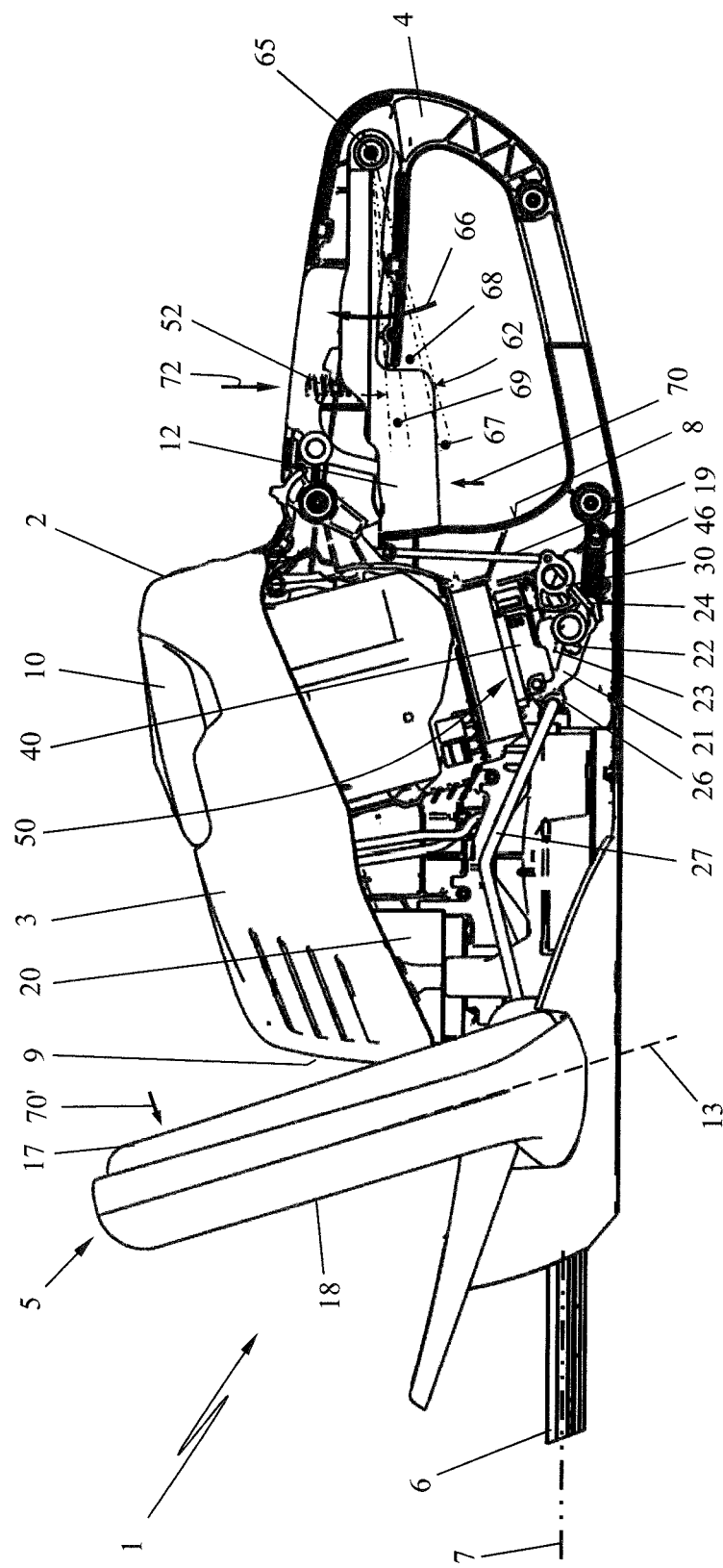
FIG. 2 shows, in an enlarged illustration, the housing of the work apparatus according to FIG. 1 in a partial section.

The handheld work apparatus which is shown is an electric work apparatus, preferably a battery-operated electric work apparatus. The battery 10 of the work apparatus is pushed into a housing shaft 11 and serves for the electric power supply of an electric drive motor 20 provided in the work apparatus 1 (FIG. 2).

In the embodiment shown, in order to start the electric drive motor 20, a user has to operate a first actuating element 12 which is arranged as a throttle lever 16 in the handle 4 of the work apparatus 1.

For reliable operation of the electric work apparatus 1, it may be advantageous to provide a further second actuating element 17 in the second front handle 5, the actuating element being displaceable relative to the handle housing 18 of the front handle 5.

In the embodiment shown, in order to start the electric drive motor 20, a user has to both operate the first actuating element 12 on the first handle 4 and press down the second actuating element 17 in the second handle 5. This corresponds to the construction and the function of a "two-handed safety mechanism". This ensures that, during the starting of the handheld work apparatus 1, the user has positioned both hands on the work apparatus 1.

It may be sufficient to provide the starting of the work apparatus 1 via only a single actuating element; the work apparatus 1 can thus be put into operation only via the actuating element 12.

As can be seen from the enlarged partial section according to the illustration in FIG. 2, the first actuating element 12 acts on a rocker 21 via a coupling rod 19. The rocker 21 bears a coupling element 22 which acts on a transmission element 23. In this way, the transmission element 23 is coupled to the actuating element 12 in the handle 4 depending on position. The transmission element 23 is connected via a tension rod 24 to a switching cam 30 which is rotatable about a cam axis 36. The switching cam 30 is used to actuate an electric switching element 40 which forms an operating switch of the work apparatus. The electric drive motor 20 is put into operation via the electric switching element 40 or the operating switch. The switching cam 30 acts on a switching leaf 41 of the switching element 40.

The rocker 21 can be pivotable about a housing-mounted rotational axis via the coupling rod 19; in the embodiment shown according to FIG. 2, the rocker 21 is connected at the one end to the coupling rod 19 of the first actuating element 12. An actuating rod 27 acts on the other end 26 of the rocker 21, the actuating rod being coupled to the second actuating element 17 in the second handle 5.

The coupling element 22, the transmission element 23 and the switching cam 30 form a device 50 for starting the electric drive motor 20 via at least one actuating element 12 of the work apparatus; in the embodiment only by actuation of the first actuating element 12 and of the second actuating element 17 is the coupling element 22 of the rocker 21 shifted to an extent such that the switching element 40 is actuated and the drive motor 20 is switched on.

Figure 3:
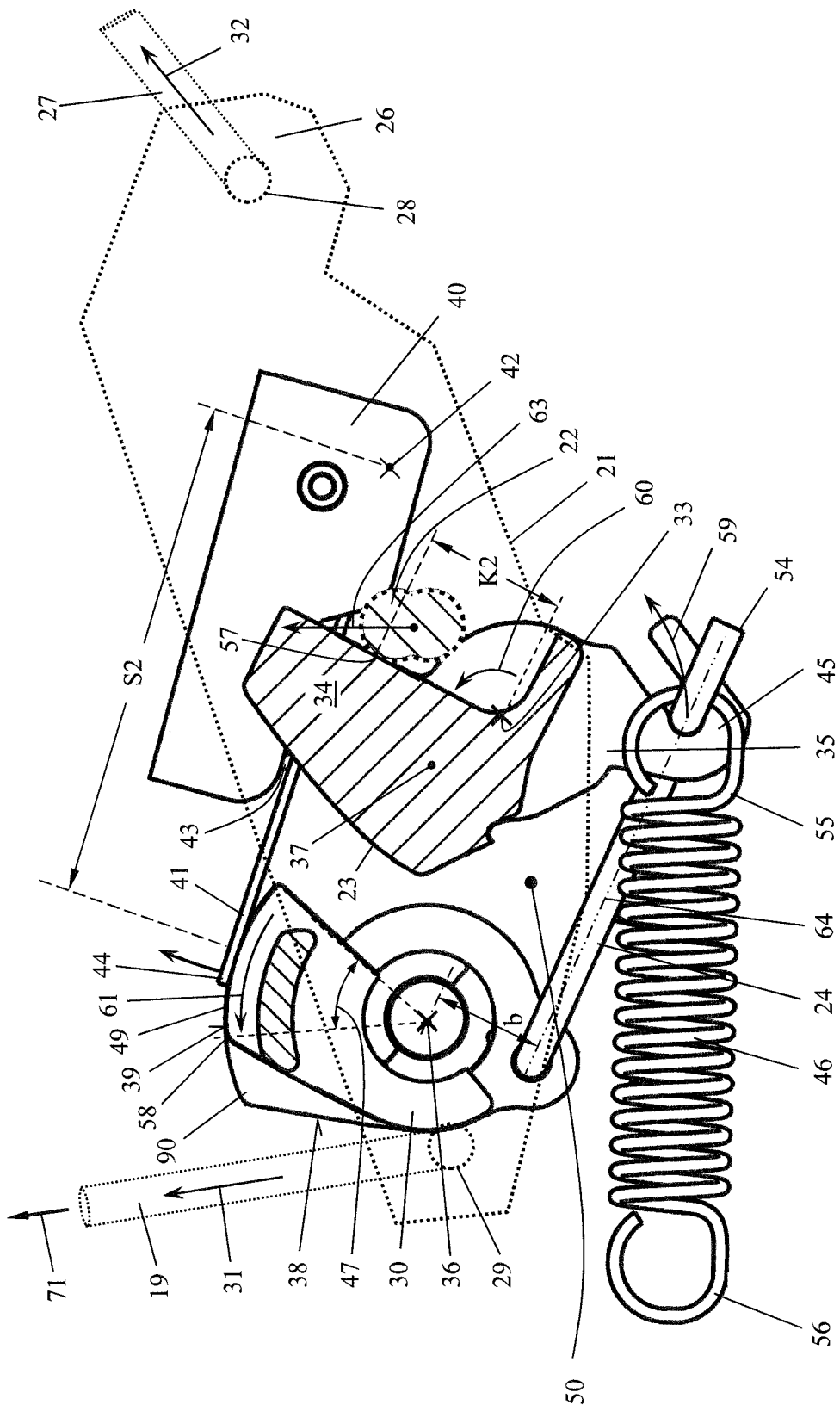
FIG. 3 shows, in an enlarged illustration, a device arranged in the housing for actuating an electric switching element.

The basic construction of the device 50 is illustrated in enlarged form in FIG. 3. FIG. 3 shows a vertical section through the device 50 according to FIG. 2. The view of the section is rotated by 180° in the drawing plane of FIG. 3, and therefore the coupling rod 19 of the first actuating element 12 lies on the left and the actuating rod 27 of the second actuating element 17 is illustrated on the right in FIG. 3.

The coupling rod 19 and the actuating rod 27 are advantageously connected rigidly and in each case via joint locations 28 and 29 to the rocker 21, indicated by dotted lines. Upon a pull in the arrow direction 31 on the coupling rod 19, the rocker 21 can therefore rotate about the joint location 28; upon a pull in the arrow direction 32 on the actuating rod 27, the rocker 21 can rotate about the joint location 29.

In FIG. 2, the rocker 21 lies behind the transmission element 23 and the switching cam 30; in FIG. 3, the rocker 21, illustrated by dotted lines, lies in the front plane of the drawing. The transmission element 23 and the switching cam 30 therefore lie behind the rocker 21, indicated by dotted lines.

The rocker 21 bears the coupling element 22. The coupling element 22 lies on the side surface of the rocker 21 which is situated facing the transmission element 23.

The transmission element 23 rotates about a lever axis 33. The transmission element 23 is essentially configured here as a two-armed lever. The lever forms an intermediate lever 37. The coupling element 22 of the rocker 21 lies against the first lever arm 34; the tension rod 24 acts on the end 45 of the second lever arm 35, the tension rod coupling the rotational path of the transmission element 23 to the rotational path of the switching cam 30.

The switching cam 30 rotates about the cam axis 36 and acts—initially via a contact edge 58—on the switching leaf 41 of the electric switching element 40, in the embodiment the operating switch of the electric drive motor 20.

The switching leaf 41 of the switching element 40 rotates about an actuating axis 42. The switching leaf 41 is used to actuate a switch pin 43 of the switching element, the switch pin lying between the free end 44 of the switching leaf 41 and the actuating axis 42 of the switching leaf 41.

Figure 5:
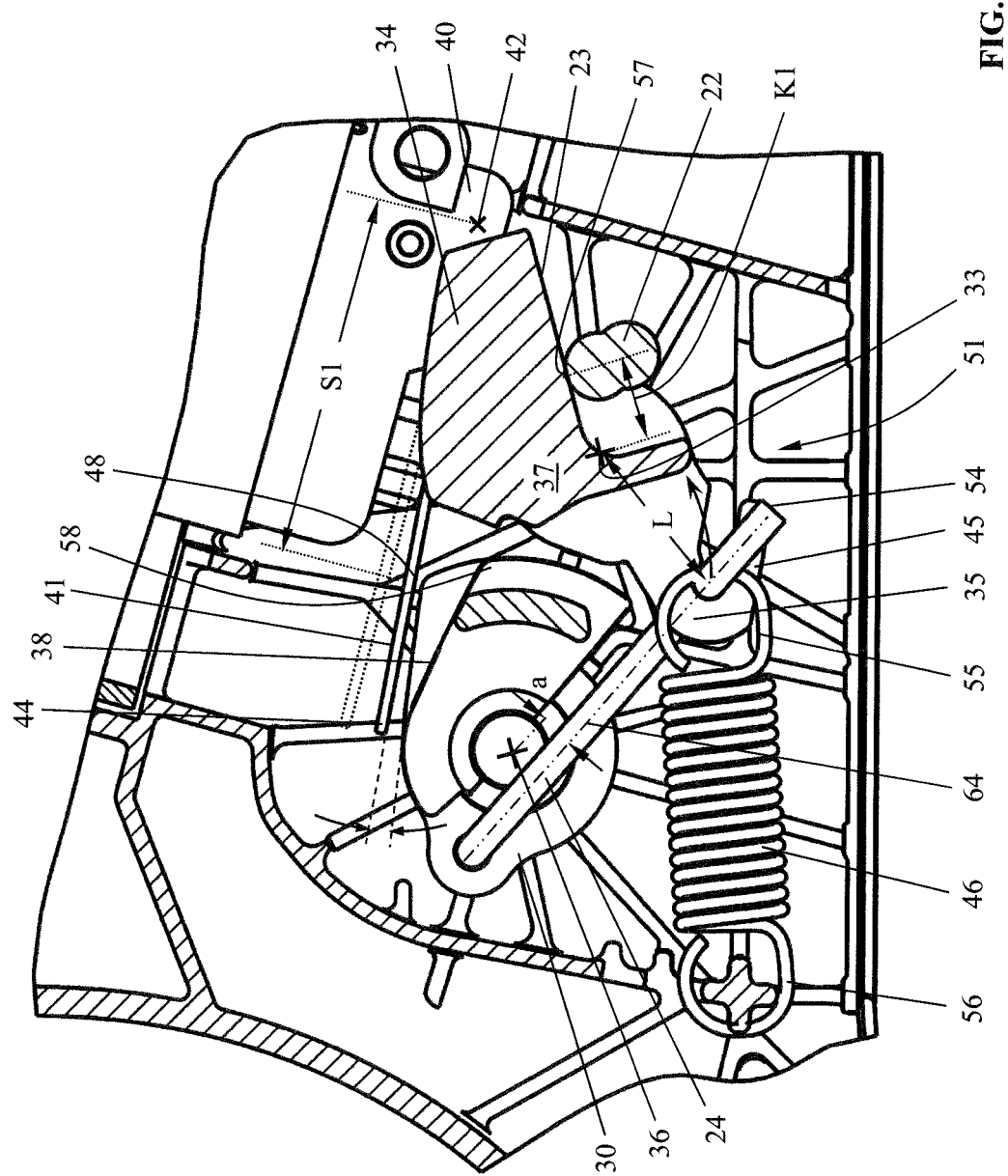
FIG. 5 shows, in an enlarged illustration, a detail from the side view according to FIG. 2 with the device for actuating the switching element in the rest position.
Figure 6:
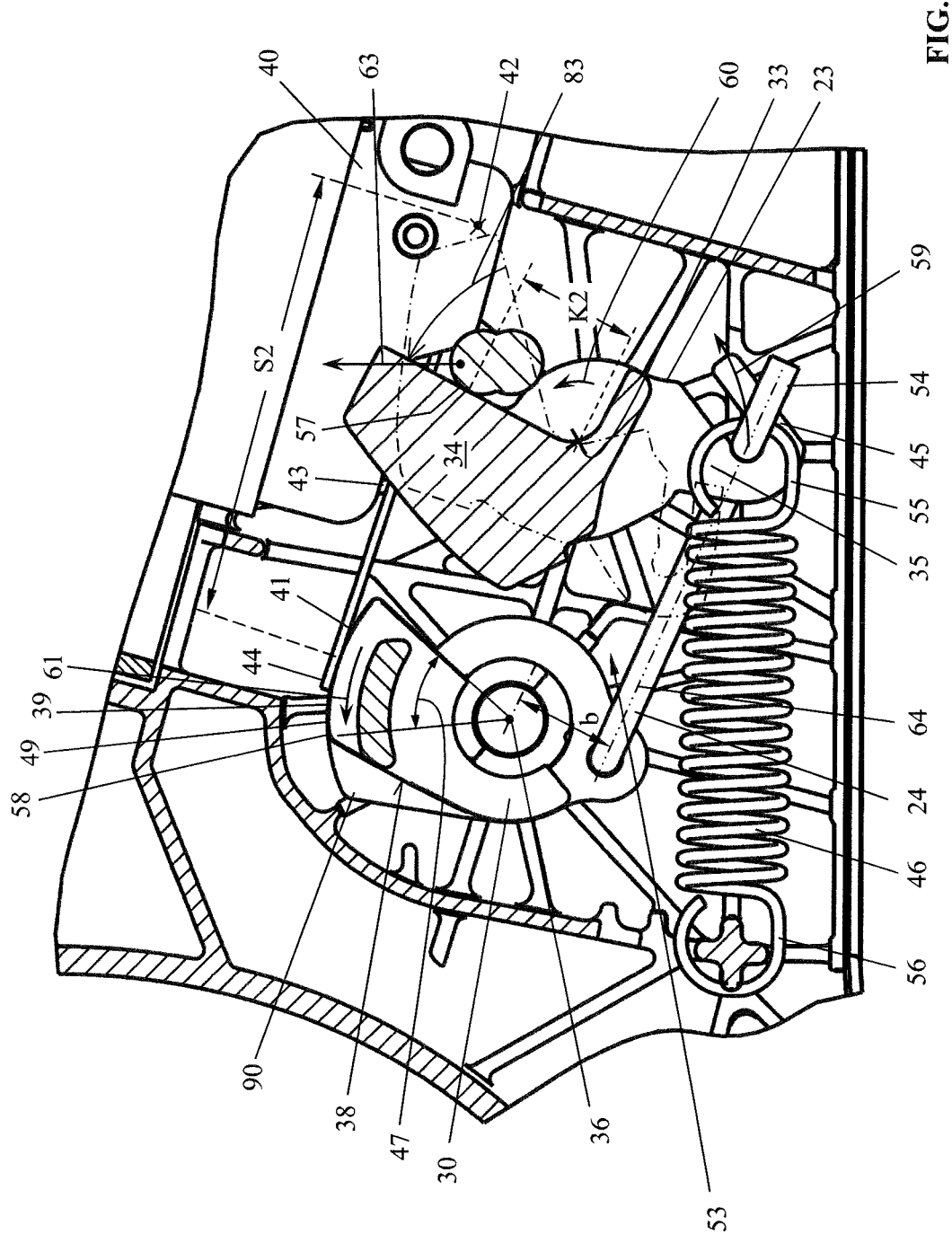
FIG. 6 shows an illustration of the device according to FIG. 5 with the device for the switching element in the end position; and, FIG. 7 shows, in a schematic illustration, a force/travel diagram of an actuating element.

The switching cam 30 has a rising flank 38 which, cf. FIG. 5, when the actuating element 12 is not actuated in the rest position of the device 50, has a spacing 48, in particular a small spacing of a few millimeters, from the switching leaf 41. This rest position 51 of the switching cam 30 according to FIG. 5 corresponds to a starting position of the switching cam 30 (FIG. 5). The switching cam 30 furthermore has a run-out flank 39 which adjoins the rising flank 38. The run-out flank 39 is advantageously configured as a circular arc segment 49 about the cam axis 36. The circular arc segment 49 has an arc angle 47 of approximately 45°, as FIGS. 3 and 6 show.

The force of a tension spring 46 which acts on the free end 45 of the second lever arm 35 of the transmission element 23 substantially acts on the device 50 for starting the electric drive motor 1. Furthermore, a return spring 52 acts on the actuating element 12 which, in the embodiment, is arranged in the first handle 4, the return spring acting upon the actuating element 12 with a spring force 72 in the direction of its rest position.

Starting from the rest position 51 in FIG. 5, when the actuating element 12 is pressed down in the rear handle 4 and the second actuating element 17 is pressed into the handle housing 18 of the front handle 5, the rocker 21 is moved and the coupling element 22 is raised from the rest position 51 in the stroke direction 63, as FIG. 3 shows. In the rest position 51 according to FIG. 5, the contact surface 57 of the coupling element 22 has a spacing K1 from the lever axis 33 of the transmission element 23 configured in particular as an intermediate lever 37. The tension rod 24 acting on the free end 45 of the lever arm 35 of the intermediate lever 37 is of rectilinear configuration and has a longitudinal center axis 64 which lies at a spacing a from the cam axis 36. The tension spring 46 is securely mounted on the housing at one end 56 and acts with the other end 55 on the second lever arm 35 of the intermediate lever 37. The other end 55 of the tension spring 46 is expediently attached to a cropped end 54 of the tension rod 24.

In the rest position 51 according to the illustration in FIG. 5, an effective length of a first lever arm K1 arises between the coupling element 22 on the intermediate lever 37 and the lever axis 33 of the intermediate lever 37. The lever arm K1 is determined by the spacing of the contact surface 57 of the coupling element 22 on the first lever arm 34 of the intermediate lever 37 from the lever axis 33. Furthermore, an effective length of a second lever arm L is produced between the coupling point of the tension rod 24 on the intermediate lever 37 and the lever axis 33 of the intermediate lever 37. The tension rod 24 produces a mechanical gear connection between the intermediate lever 37 and the switching cam 30.

The contact edge 58 of the switching cam 30 that is formed between the rising flank 38 and the run-out flank 39 lies in the rest position 51 according to FIG. 5 with a spacing S1 from the actuating axis 42 of the switching leaf 41.

If the user, by pressing down the first actuating element 12 and the second actuating element 17, brings about a stroke of the coupling element 22 in the stroke direction 63 (FIG. 3), the coupling element 22 is displaced relative to the transmission element 23, which is arranged in a positionally fixed manner in the housing 3 and is configured as an intermediate lever 37, and the switching cam 30. The stroke of the coupling element 22 that is brought about in the stroke direction 63 pivots the intermediate lever 37 in the rotational direction 60, as illustrated in FIG. 3. The location of the contact surface 57 of the coupling element 22 on the first lever element 34 of the intermediate lever 37 changes in the process; the spacing of the contact surface 57 from the lever axis 33 increases up to a length of an effective lever arm K2 as illustrated in FIGS. 3 and 6. The length of the lever arm K2 in the end position 53 according to FIG. 3 is greater than the length of the lever arm K1 in the rest position according to FIG. 5.

The rotation of the intermediate lever 37 in the rotational direction 60 leads to pivoting of the free end 45 of the second lever arm 35 in direction 59 about the lever axis 33. The tension spring 46 is lengthened in the process and at the same time the switching cam 30 rotates via the tension rod 24 in rotational direction 61 about the cam axis 36. The switching leaf 41 slides over the contact edge 58 onto the run-out flank 39 which is configured as a circular arc segment 49. The spacing between the support of the switching leaf 41 on the run-out flank 39 of the switching cam 30 and the actuating axis 42 of the switching leaf 41 is increased to the spacing S2. The configuration in the form of a circular arc segment 49 enables the switching cam 30 to be rotatable beyond the switching position of the switching element 40.

In the end position 53 according to FIGS. 3 and 6, the longitudinal center axis 64 of the tension rod 24 lies at a spacing b from the cam axis 36. The spacing b in the end position 53 according to FIG. 6 is greater, in particular many times greater, than the spacing a in rest position 51 of the device 50 according to FIG. 5.

The actuating force 70 to be applied, for example, to the actuating element 12 by the user is composed of the shift force 71 of the device 50 and the spring force 72 of the return spring 52 that are to be applied to the actuating element 12. The shift force 71 to be applied in order to move the intermediate lever 37 therefore forms at least a portion of the actuating force 70 to be applied to the actuating element 12 in the handle 4 of the work apparatus 1.

In the same way, an actuating force 70' to be applied to the second actuating element 17 by the user is composed of the shift force to be applied of the device 50 and a spring force returning the actuating element 17.

Figure 4:
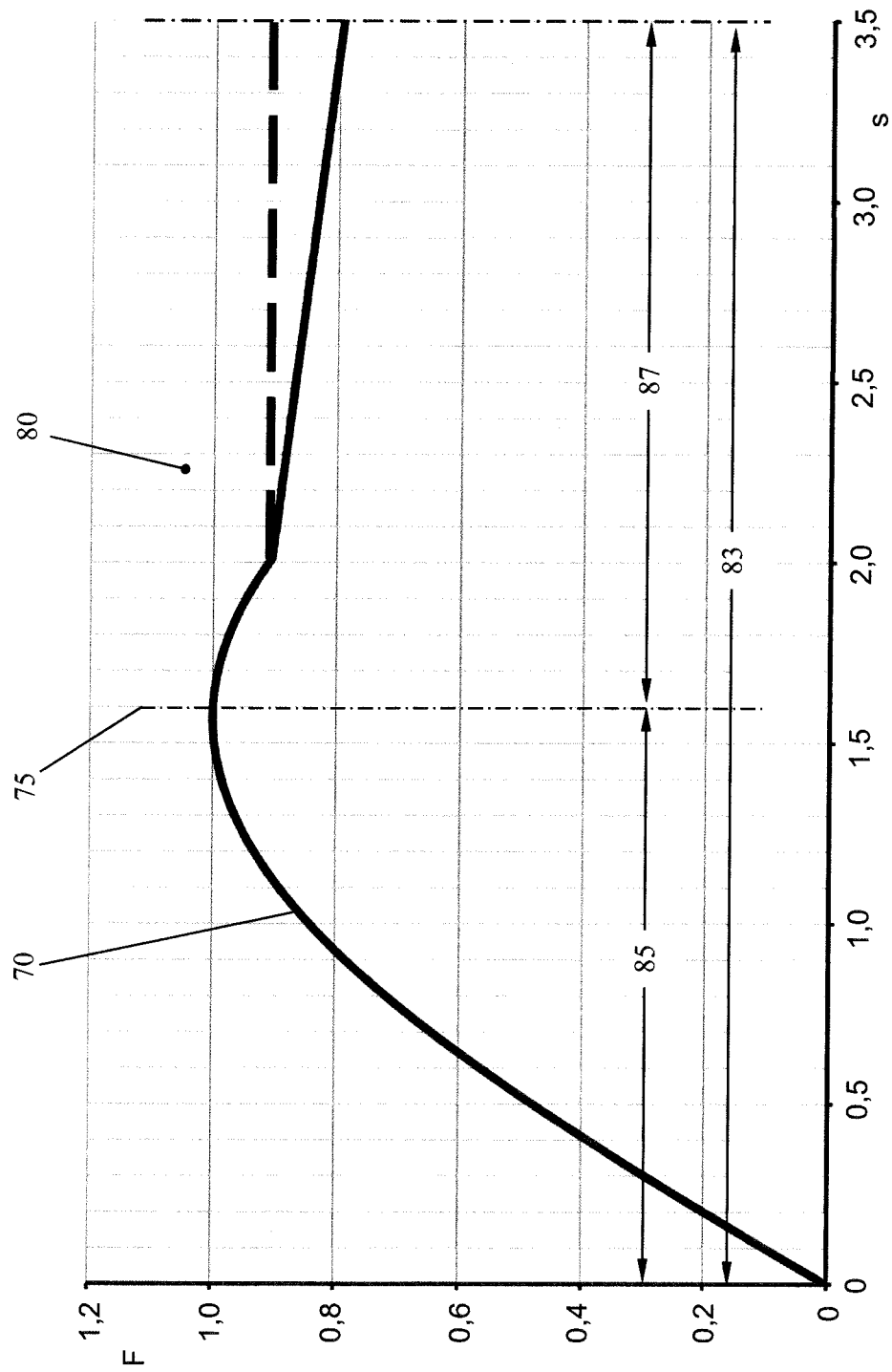
FIG. 4 shows a diagram of a standardized actuating force of an actuating element of the device over a standardized displacement path.
Figure 7:
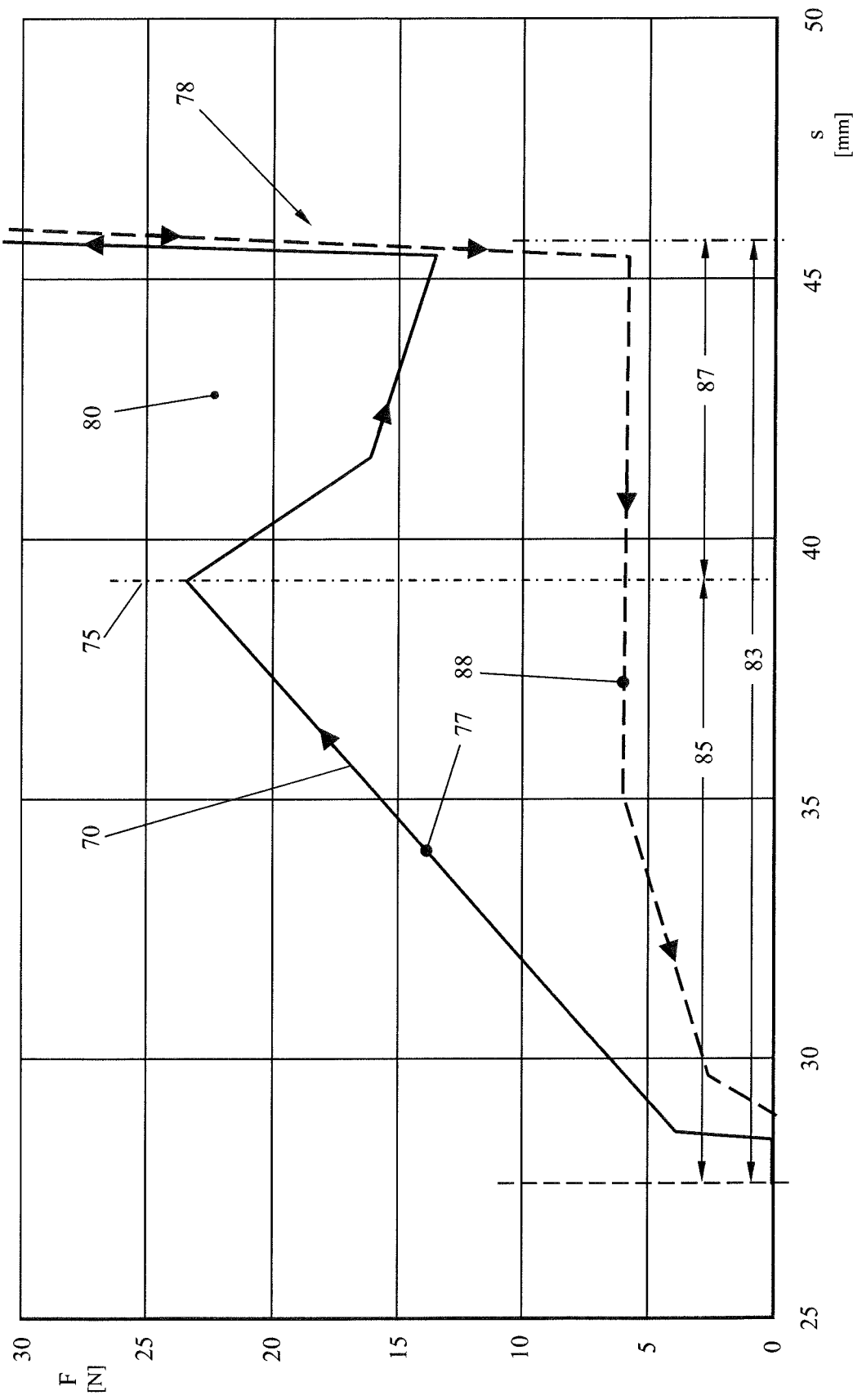

The force profile, for example, of the actuating force 70 on the actuating element 12 is reproduced by way of example in FIG. 4 or FIG. 7. The rotational path 62 of the actuating element 12 about the lever axis 65 is illustrated in FIG. 2.

By pressing down the actuating element 12, the latter—in the embodiment—carries out a pivot path about the lever axis 65 in arrow direction 66. The actuating element 12 preferably executes a pivoting movement about the lever axis 65 over the rotational path 62. In a first rotational angle range 68 which corresponds to a first path segment 85 of the displacement path 83, the actuating force 70 to be applied to the actuating lever 12 rises steeply (FIGS. 4, 7). This is caused by the fact that, from the rest position 51 into the end position 53, first of all in each case small lengths of the lever arms are effective in the device 50. The length of the lever arm K1 of the contact surface 57 of the coupling element 22 from the lever axis 33 is thus small. In a corresponding manner, the spacing a of the longitudinal center axis 64 of the tension rod 24 from the cam axis 36 is small. The spacing S1 between the contact edge 58 of the switching cam 30 and the switching leaf 41 is also initially small.

The length of the effective lever arms K1, K2, S1, S2, L, a, b of the device 50 increase with an increasing stroke of the coupling element 22 and rotation of the transmission element 23 in the rotational direction 60, and therefore—in a second rotational angle range 69 which corresponds to a second path segment 87 of the actuating element 12 (cf. FIGS. 4, 7)—the actuating force 70 decreases after a maximum 75. After switching on the drive motor 20, the holding force to be applied to the actuating element 12 by the user becomes smaller. As FIGS. 4 and 7 show, the holding force in the region of the second rotational angle region 69 or of the second path segment 87 is preferably approximately identical (dashed curve segment in FIG. 4) or decreasing (solid curve segment in FIGS. 4 and 7).

The displacement path 83 of the transmission element 23 is illustrated in FIGS. 4 and 7. The displacement path 83 includes the first path segment 85 adjoining the rest position 51 according to FIG. 5 and a second path segment 87 adjoining the first path segment 85. The second path segment 87 includes the operating range 80. The displacement force 71 to be applied to the transmission element 23 via the actuating element 12 increases on the first path segment 85 of the displacement path 83 in order, after a maximum 75 is reached, to decrease and/or to remain the same on the second path segment 87.

The actuating force 70 to be applied to the actuating element 12 is composed of the spring force 72 of the return spring 52 and the shift force 71 for the device 50 for actuating the electric switching element 40. The configuration of the effective length of the lever arms K1, K2, S1, S2, a, b particularly gives rise to a sum of shift force 71 and spring force 72, which sum is constant over a partial segment 89 of the displacement path 83. This can be gathered in particular from FIG. 4.

The configuration of the effective lever lengths K1, K2, S1, S2, L, a, b is undertaken here in such a manner that, at the maximum 75 of the shift force, the electric switching element 40 completely switches in order to put the electric drive motor 20 into operation.

As FIG. 7 shows, the switch-on curve 77, illustrated by a solid line, runs differently than the switch-off curve 88 which is illustrated by dashed lines. There is hysteresis between the switch-on curve 77 and the switch-off curve 88. While the switch-on curve 77 of the actuation force 70 rises steeply over the path S to a maximum 75, the switch-off curve 88 has a flat profile in the same path region. When the work apparatus is switched off, that is when the actuating member 12 is returned from the switch-on position according to FIG. 6 into the starting position according to FIG. 5, the force F acting on the actuating member 12 is smaller than the switch-on force, in particular is many times smaller than the switch-on force.

After an actuating path s of approximately 46 mm is passed through, the actuating force F rises steeply, as FIG. 7 shows. This steep rise of the curve branch 78 is brought about by the fact that the actuating element 12 is blocked, that is, strikes against a stop. This can be a housing-mounted stop against which the actuating element 12 strikes, or else a stop provided in the rotational path of the switching cam 30 or a stop provided in the adjustment path of the transmission element 23.

It may be advantageous to provide the switching cam 30 with a further cam path 90 via which a further switching leaf (not illustrated) of a further electric switching element can be actuated. This further electric switching element can be used, for example, as a brake switch of the electric drive motor.

It is understood that the foregoing description is that of the preferred embodiments of the invention and that various changes and modifications may be made thereto without departing from the spirit and scope of the invention as defined in the appended claims.

What is claimed is:

1. A handheld work apparatus comprising:
   an electric motor;
   a handle;
   an actuating element arranged in said handle and configured to be displaceable to an operating position counter to an actuating force;
   a transmission element coupled to said actuating element in a positionally dependent manner and configured to be adjustable from a rest position to an operating range in dependence upon a position of said actuating element;
   an electrical switching element;
   said transmission element being configured to actuate said electrical switching element in order to start said electric motor;

said transmission element being configured to be adjustable from said rest position along a displacement path to an end position via a shift force;

said shift force required for moving said transmission element forming at least a portion of said actuating force;

said displacement path including a first path segment adjoining said end position;

said displacement path including a second path segment adjoining said first path segment;

said second path segment including said operating range; and, said shift force required for moving said transmission element increasing in said first path segment and decreasing in said second path segment after reaching a maximum.

2. The handheld work apparatus of claim 1, wherein said actuating element is configured to be displaced counter to a spring force; and, said spring force and said shift force add up to said actuating force.

3. The handheld work apparatus of claim 2, wherein a sum of said shift force and said spring force is constant over a partial section of said displacement path.

4. The handheld work apparatus of claim 1, wherein said electrical switching element is configured to switch on said electric motor in a region around said maximum of said shift force.

5. The handheld work apparatus of claim 1, wherein said transmission element is an intermediate lever rotatable about a lever axis.

6. The handheld work apparatus of claim 5 further comprising:
a coupling element configured to be displaceable via said actuating element;
said intermediate lever having a first lever arm; and,
said coupling element lying against said first lever arm.

7. The handheld work apparatus of claim 6, wherein:
said coupling element and said lever axis of said intermediate lever define an effective lever length therebetween; and,
said effective lever length is configured to change in dependence upon a rotational angle of said intermediate lever.

8. The handheld work apparatus of claim 1 further comprising:
a switching cam configured to rotate about a cam axis; and,
said electrical switching element being configured to be switched by said switching cam.

9. The handheld work apparatus of claim 5 further comprising:
a tension rod;
a switching cam; and,
said intermediate lever having a lever arm connected to said switching cam via said tension rod.

10. The handheld work apparatus of claim 8 further comprising:
a tension rod;
said transmission element being an intermediate lever rotatable about a lever axis; and,
said intermediate lever having a lever arm connected to said switching cam via said tension rod.

11. The handheld work apparatus of claim 8, wherein:
said electrical switching element defines a switching position; and,
said switching cam is configured to be rotatable beyond said switching position of said electrical switching element.

12. The handheld work apparatus of claim 8, wherein:
said electrical switching element is configured as an operating switch having a switching leaf; and,
said switching cam includes a rising flank which, in a resting position of said switching cam, lies at a distance to said switching leaf of said electrical switching element.

13. The handheld work apparatus of claim 12, wherein:
said switching cam further includes a run-out flank adjoining said rising flank; and,
said run-out flank is formed as a circular arc segment around said cam axis.

14. The handheld work apparatus of claim 8, wherein:
said electrical switching element includes a switching leaf defining an actuating axis;
said switching cam defines a contact point on said switching leaf;
said actuating axis of said switching leaf and said contact point of said switching cam on said switching leaf define a distance (S1, S2) therebetween; and,
said distance (S1, S2) forms a switching lever and is configured to increase when said switching cam is rotated.

15. The handheld work apparatus of claim 1 further comprising:
a switching cam configured to rotate about a cam axis;
a coupling element configured to be displaceable via said actuating element;
said transmission element having a tension rod;
said switching cam defining a coupling point for said tension rod;
said transmission element being an intermediate lever rotatable about a lever axis;
said coupling element and said lever axis of said intermediate lever defining a first effective lever length therebetween when said transmission element is in said rest position;
said coupling point and said lever axis of said intermediate lever defining a second effective lever length therebetween when said transmission element is in said rest position; and,
said first effective lever length being less than said second effective lever length.

* * * * *